United States Patent Office 3,806,335
Patented Apr. 23, 1974

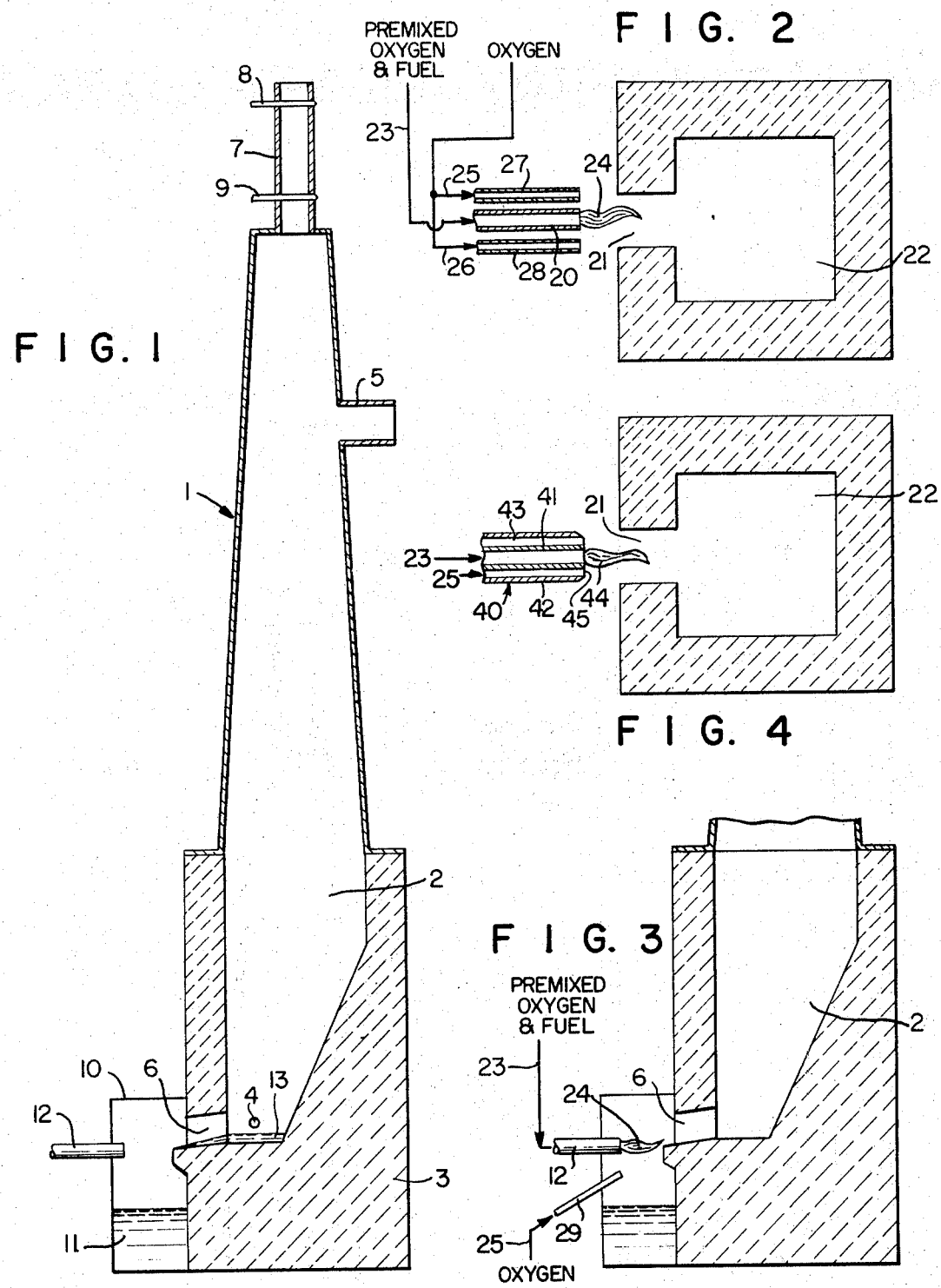

3,806,335
PROCESS FOR PREVENTING SOLIDIFICATION
IN REFUSE CONVERTER TAPHOLE
John Erling Anderson, Katonah, N.Y., assignor to Union
Carbide Corporation, New York, N.Y.
Filed Dec. 29, 1972, Ser. No. 319,529
Int. Cl. C21b 3/04
U.S. Cl. 75—44 S                                    8 Claims

ABSTRACT OF THE DISCLOSURE

A process for heating a taphole in the hearth of a furnace operating under positive pressure so as to maintain the taphole open for the continuous withdrawal of molten metal and/or slag. The process comprises the steps of:
(1) feeding a less than stoichiometric mixture of oxygen and fuel to a pre-mixed burner to form a stable flame,
(2) directing the flame upon the opening of the taphole, and
(3) directing a stream of oxygen-containing gas proximate to the flame so as to mix with the flame and form a gaseous mixture containing at least a stoichiometric amount of $O_2$ relative to the uncombusted fuel.

BACKGROUND

This invention relates, in general, to solid refuse disposal, and more particularly, to a method for preventing slag solidification in the taphole of high temperature refuse converters.

In an effort to solve some of the ecological problems relating to the disposal of industrial and municipal wastes, an oxygen refuse converter has been developed capable of handling a wide variety of compositional matter and converting such material into useful fuel gases and inert solid residues. My copending application, Ser. No. 161,107, filed July 9, 1971, now U.S. Pat. 3,729,298, incorporated herein by reference, describes this oxygen refuse converter process. Suitable apparatus for carrying out said process is described in my copending application Ser. No. 319,530, filed of even date herewith. The waste material thus capable of being converted includes combustible materials, such as paper, plastic, wood, food waste and the like, and normally non-combustible materials such as metal, glass and fusible cementitious materials. Generally, the combustible materials are reduced, for the main part, to gases which are discharged at the top of the shaft furnace, and the non-combustible materials produce a molten residue of metal and slag which is tapped at the base of the furnace.

Heretofore, one of the critical problems in maintaining a smooth and uninterrupted furnace operation has been the inability to maintain a continuous flow of molten metal and slag from the taphole over a prolonged period of time. This can only be accomplished if, first, the solid residue, comprising mainly metal, glass and ash, is kept at a high enough temperature to be molten in the hearth, and second, the taphole is sufficiently hot to permit the molten stream to flow from the hearth into a collection vessel without solidifying.

The problem of maintaining the taphole open is particularly troublesome in a furnace operating under positive pressure. In furnaces which operate at a pressure greater than atmospheric, such as a blast furnace, pressure is maintained by maintaining the taphole submerged. However, this mode of operation is impractical in a waste converter, since the refuse composition does not remain uniform, but fluctuates with respect to the amount of metal and slag producing constituents. This makes it difficult to maintain the level of molten material in the hearth continually above the taphole opening in order to prevent depressurization in the furnace. If the surface of the molten residue in a refuse converter is allowed to fall below the taphole opening, gas may flow from the hearth to outside the furnace where it may form an explosive mixture with the surrounding atmosphere. Consequently, the refuse converter described in my above-mentioned copending application is preferably operated with a non-submerged taphole, suitably enclosed to prevent the taphole opening from communicating with the surrounding atmosphere. As a result, the explosion hazard is minimized, and in general, the continuous removal of molten metal and slag from the hearth is greatly facilitated.

Conventional premixed type oxy-fuel burners have been suggested in the art of refuse incineration, for example by U.S. Pat. No. 3,537,410, for heating the taphole and maintaining the slag in a molten state. Such burners, however, have been generally unsuccessful, particularly in a refuse converter operating under positive pressure wherein the burner flames directed at the taphole operate in a reducing, i.e., oxygen-lean, atmosphere. That is to say, the taphole and the adjacent collection vessel into which it discharges are necessarily enclosed and do not communicate with the surrounding atmosphere in order to permit the taphole to operate in the preferred non-submerged condition.

The problem with directing the flames of a pre-mix oxy-fuel burner into a substantially oxygen-depleted atmosphere to heat the furnace tap lies with the very nature of pre-mix burners, namely, burners wherein the fuel-oxidant composition is pre-mixed within the burner and then ignited at the discharge port to form heating flames. Such burners require an oxy-fuel ratio below stoichiometric in order to operate stably. Yet, at these conditions, the temperature of the resulting flames is not sufficiently hot to prevent the molten slag from solidifying in the tap. On the other hand, if oxy-fuel mixtures above the stoichiometric ratio are used, they are susceptible to being ignited within the burner, resulting in flashback of the gas. This is highly undesirable because it causes damage to the burner and presents an explosion hazard. Consequently, the burners are operated at a reduced oxy-fuel ratio to ensure stability of the flame although the resultant heat transfer from the flame is frequently incapable of maintaining the slag in a molten state. The problem is intensified as the gaseous combustion products of the burner flow into the hearth. The gaseous combustion stream is reduced chemically as it comes into contact with the carbon present in the hearth, the carbon being generally in the form of char which flows on top of the molten slag. This reaction is endoethermic, thereby lowering the temperature of the hearth and causing the viscosity of the molten mass to increase to the point where it may become extremely difficult to pour. In extreme cases, the molten bath will completely solidify, thereby necessitating a shut-down of the entire furnace operation.

OBJECTS

Accordingly, it is an object of this invention to provide a process for heating an enclosed taphole in a furnace in order to maintain a continuous flow of molten metal and slag from the furnace.

It is another object of the invention to provide a process whereby a pre-mix type oxy-fuel burner can be efficiently used to provide a high temperature flame without creating the risk of flashback in the burner.

SUMMARY OF THE INVENTION

These and other objects which will become apparent from the detailed disclosure and claims to follow, are achieved by the present invention, one aspect of which comprises:

A process for heating a taphole in the hearth of a furnace and maintaining it open, said hearth containing molten metal and/or slag, said furnace operating under a positive pressure relative to the ambient pressure, the opening of said taphole being disposed within an enclosure for preventing said taphole from communicating with the surrounding atmosphere, comprising the steps of:

(1) providing burner means for heating said taphole, said burner means being of the pre-mixed type and adapted to burn a fuel-oxygen mixture, (2) feeding a mixture of fuel and oxygen into the combustion zone of said burner means at a rate such that the ratio of oxygen to fuel is less than that required for stoichiometric combustion of the fuel, (3) combusting the fuel and oxygen in the combustion zone of said burner to produce a stable flame, (4) directing the flame from said burner upon the opening of said taphole, and (5) directing a stream of oxygen-containing gas proximate to the flame so as to mix therewith and form a gaseous mixture containing oxygen and fuel in a ratio of at least that required for stoichiometric combustion of the fuel, whereby upon combustion of at least a portion of the uncombusted fuel in the flame and at least a portion of the uncombusted carbon in the hearth, the temperature of said taphole is increased sufficiently to maintain the metal and/or slag in a fluid condition for tapping.

The term "pre-mixed burner" means any conventional burner wherein the fuel gas is pre-mixed with an oxidant gas within a section of the burner prior to ignition. This is in contrast to direct or post-mixed burners wherein the fuel and oxidizer are mixed at the point of ignition at the discharge ports of the burner.

The term "slag" as used herein is intended to mean the inorganic portion of the refuse which is not combustible, and which becomes fluid in the hearth and tapped from the base of the furnace in a molten or fluid condition. The slag is formed predominantly of materials such as glass and cementitious materials.

The term "hearth" as used herein refers to the combustion and melting zone of the furnace wherein the char reacts exothermically with the oxidant gas fed to the furnace to create the heat and thermal driving force necessary to melt the metallic portions of the refuse, glass and other cementitious matter to convert it to a fluid slag.

One of the essential discoveries of the present invention is that by directing an oxygen-containing gas stream either directly at or in the general vicinity of the burner flame, the temperature of said flame and its corresponding ability to transfer heat can be increased to the point where the tap temperature no longer poses a problem. That is, if any oxy-fuel flame of a pre-mixed burner is used to heat the taphole, the addition of auxiliary oxygen to the flame, in accordance with the present invention, will prevent molten slag from solidifying in the taphole by markedly increasing the taphole temperature. The oxygen-containing gas is preferably pure oxygen although oxygen-enriched air and air are also suitable for this purpose.

The increased tap temperature resulting from the method of the invention is attributable, primarily, to two effects. First, the addition of at least a stoichiometric amount of oxygen relative to the uncombusted fuel in the flame results in further combustion taking place in the flame, and hence an increase in the amount of heat produced. Second, the presence of auxiliary oxygen in the burner combustion stream changes its character from a reducing to an oxidizing mixture, thereby resulting in an exothermic reaction taking place in the hearth near the tap. Specifically, oxygen in the gaseou mixture reacts exothermically with the carbon in the hearth to form CO or $CO_2$ thereby heating the molten bath and lowering its viscosity. Thus, the oxygen-containing gas has a two-fold effect on maintaining the slag in a fluid condition.

It will be appreciated by one skilled in the art that the mixing of the oxygen-containing gas with the burner flame can be accomplished in numerous ways. Thus, for example, the oxygen-containing gas can be directed coaxially with the burner flame, but separate therefrom as a so-called "shroud gas" surrounding the flame. When operating in this manner, the shroud oxygen is aspirated into the burner gas stream and mixes therewith. This can be readily accomplished, for example, in a conventional burner having at least two internal tubes in concentric axially aligned relationship by feeding the oxy-fuel mixture through the center tube and the oxygen-containing gas through the annular passage. If desired, the same annular shroud effect can be achieved in a single barrel burner, for example, by directing a plurality of oxygen-containing gas jets parallel to the axis of the flame and apart therefrom, the jets being positioned along the sides of the burner. In either case, the flame temperature will be increased as shroud oxygen is aspirated into the mixture discharged from the burner. Alternatively, the desired mixing effect can be achieved by using an "undershot" jet of oxygen-containing gas which directly impinges upon the burner flame to raise its temperature. Thus, the term "proximate to," as used throughout the disclosure and claims, contemplates directly contacting the flame with an oxygen-containing stream (e.g. undershot oxygen) as well as indirect contact between the streams (e.g. aspiration of oxygen into the flame). It should be clear, however, that the precise manner in which oxygen ultimately mixes with the flame is relatively unimportant.

Although, in theory, the oxy-fuel ratio based upon the combined burner and auxiliary oxygen stream need be no greater than stoichiometric, in actual practice, it is preferable that oxygen be present in an excess of at least ten percent above that required for the stoichiometric combustion of the fuel. Also, the combined oxidant streams should have an oxygen content of at least 40% by volume. This is to insure that the flame contacting the taphole will always be oxidizing. This is particularly important if large amounts of char are present in the molten slag. In extreme cases, where relatively large amounts of unreacted carbon are present in the hearth, the fuel to the burner can be shut off entirely. In such cases, the heat generated by the reaction between the oxygen stream and the carbon will be sufficient to maintain the slag molten throughout the tap.

To insure an effective continuous tapping, in accordance with the present invention, the product of the higher heating value of the fuel (hydrogen burned to liquid water) and the mass flow rate of the fuel should be greater than that defined by the following formula:

$$HHV \times Q > 50,000 \text{ b.t.u./hr.}$$

where: HHV=higher heating value, b.t.u./lb. and Q= mass flow rate of fuel, lbs./hr.

In addition, the heat supplied from the burner should not exceed 250,000 b.t.u./hr. per square inch of cross-sectional area of the taphole.

DRAWINGS

FIG. 1 is a schematic drawing, in partial cross-section, of a refuse converter showing the relative orientation of the pre-mix burner and the enclosed taphole in accordance with the invention.

FIG. 2 is a schematic drawing illustrating, in elevation, one embodiment of the invention; i.e., a burner, surrounded by jets of oxygen-containing gas, heating the taphole.

FIG. 3 is a schematic drawing, similar to FIG. 1, illustrating another embodiment of the invention., i.e., a burner with an "undershot" stream of oxygen-containing gas.

FIG. 4 is a schematic drawing illustrating yet another embodiment of the invention; i.e., a burner suitable for providing a shroud of oxygen-containing gas.

DETAILED DESCRIPTION

Referring to FIG. 1, there is shown a shaft reactor or furnace 1, the bottom portion of which comprises a combustion and melting zone 2, commonly referred to as the hearth. Refractory brick 3 surrounds hearth 2 in order to conserve heat and maintain uniform temperature therein, the hearth being generally maintained at a temperature of around 3000° F. Shaft furnace 1 is provided with an oxidant gas inlet port 4, a gas discharge port 5 and a slag taphole 6. Water quenched tank 11, adjacent to taphole 6, is contained within the enclosure 10 which serves to prevent taphole 6 from communicating with the atmosphere. Burner 12 protrudes into enclosure 10 and is directed at the opening of taphole 6. A refuse feed hopper (not shown), communicating through slide valve 8 with feed chute 7, is fixtedly attached to the top of shaft furnace 1. A second slide valve 9 is used in combination with valve 8 to maintain the reactor 1 sealed while refuse is being fed.

The refuse, as it drops down the furnace 1, is dried and the organic combustible material is thermally decomposed, primarily to carbon monoxide, hydrogen, water vapor, carbon dioxide and hydrocarbon vapors, all of which exit through discharge port 5. The solid residue forms char which is predominantly carbon. Metal, cementitious materials, glass and like non-combustibles, together with the char, proceed further down the shaft furnace in the hearth 2 wherein the char reacts exothermically with the oxidant gas entering the furnace through inlet port 4 thereby creating the heat necessary to melt the metallic portion of the refuse and to convert the glass and other cementitious materials to a fluid slag which collects in a molten pool 13 in hearth 2. Pool 13 of fluid metal and slag is discharged from furnace 1, through taphole 6, into water quenched tank 11 wherein the metal and slag solidify in granular form. Enclosure 10 enables furnace 1 to be operated at slightly above atmospheric pressure with a non-submerged taphole by providing a seal, in effect, between the continuously discharging tap 6 and the surrounding atmosphere.

FIG. 2 illustrates one embodiment for practicing the process of the invention. Pre-mix burner 20 is schematically illustrated heating tap 21 in the furnace hearth 22. A mixture of oxygen and fuel, illustrated by arrow 23, is fed into burner 20 to form flame 24 directed at tap 21. Oxygen-containing gas, indicated by arrows 25 and 26, are fed into side tubes, 27 and 28, respectively, positioned around the burner so as to direct two jets of oxygen-containing gas parallel to flame 24 but sufficiently close thereto so that said oxygen-containing gas will be aspirated into the flame 24 and mixed therewith.

FIG. 3 illustrates another embodiment of the invention, namely, the use of an "undershot" jet of oxygen-containing gas. In FIG. 3, as in FIG. 1, burner 12 is schematically shown being directed at hearth 2 to heat tap 6 with flame 24. An oxy-fuel mixture 23, containing a less than stoichiometric amount of oxygen for combusting the fuel, is fed into burner 12 to form flame 24. An oxygen containing gas, indicated by arrow 25, is fed into tube 29 which is positioned as an undershot jet, namely, in the vicinity of the flame and at an angle relative to its axis such that the stream of oxygen-containing gas 25 leaving tube 29 will directly impinge upon a portion of flame 24 and mix therewith.

The use of a shroud gas, as shown in FIG. 2, can be alternatively provided in a multi-barrel burner, as shown schematically in FIG. 4. Burner 40 comprises center tube 41 concentrically positioned within outer tube 42 to form annulus 43. A mixture of oxygen and fuel 23 is combusted upon leaving tube 41 to form flame 44 which is directed at tap 21. An oxygen-containing gas 25 is fed into annulus 43 thereby providing an annular shroud at the discharge end 45 which is aspirated into flame 44.

EXAMPLE

Experiments were conducted utilizing the process of the invention in conjunction with an oxygen refuse converter, such as referred to in the specification. Two lengths of ¼" O.D. copper tubing were each placed alongside the premixed burner at a distance therefrom of 1.5", as measured from their respective axes, in the manner illustrated in FIG. 2. The inside diameter of the burner tube was ¼". Refuse feed rates in the refuse converter were varied from about 80 to 400 lbs./hr. while the stream of molten products leaving the slag tap varied from 20 to 100 lbs./hr.

For this range of operating conditions, steady operation of the furnace was achieved using the following gas flow rates:

| Burner: | CFH at NTP |
|---|---|
| Oxygen | 125 |
| Methane | 100 |
| Side Tubes: | |
| Oxygen | 100 |

These flow rates correspond to an oxy-fuel ratio of 1.25 for the burner and an overall ratio of 2.25 for the combined burner and side tubes. The stoichiometric oxy-fuel ratio for methane fuel is 2. During these tests it was found essential to maintain the oxy-fuel ratio for the combined burner and side tubes greater than stoichiometric. When the ratio was less than stoichiometric, the molten stream tended to become very viscous in the tap and the molten product started to build up in the hearth.

What is claimed is:

1. A process for heating a taphole in the hearth of a furnace and maintaining it open, said hearth containing uncombusted carbon and molten metal and/or slag, said furnace operating under a positive pressure relative to ambient pressure, the opening of said taphole being disposed within an enclosure for preventing said taphole from communicating with the surrounding atmosphere, comprising the steps of:
   (1) providing burner means for heating said taphole, said burner means being of the pre-mixed type and adapted to burn a fuel-oxygen mixture,
   (2) feeding a mixture of fuel and oxygen-containing gas into the combustion zone of said burner means at a rate such that the ratio of oxygen to fuel is less than that required for stoichiometric combustion of the fuel,
   (3) combusting the fuel and oxygen in the combustion zone of said burner to produce a stable flame,
   (4) directing the flame from said burner upon the opening of said taphole, and
   (5) directing at least one stream of oxygen-containing gas proximate to the flame so as to mix therewith and form a gaseous mixture containing oxygen and fuel in a ratio of at least that required for stoichiometric combustion of the fuel, whereby upon combustion of at least a portion of the uncombusted fuel in the flame and at least a portion of the uncombusted carbon in the hearth, the temperature of said taphole is increased sufficiently to maintain the metal and/or slag in a fluid condition for tapping.

2. The process of claim 1 wherein said oxygen-containing gas is selected from the group consisting of air, oxygen-enriched air and oxygen.

3. The process of claim 1 wherein said burner means contain at least two internal tubes in concentric axially aligned relationship defining an annular passageway therebetween, said mixture of fuel and oxygen being fed into the center tube, and said oxygen-containing gas being fed into the annular passageway.

4. The process of claim 1 wherein said stream of oxygen-containing gas is directed at said flame so as to impinge thereupon.

5. The process of claim 1 wherein at least one jet of oxygen-containing gas is directed substantially parallel to the axis of the flame and apart therefrom such that at least a portion of the oxygen-containing gas of said jet is aspirated into the flame.

6. The process of claim 1 wherein the oxygen content in the combined oxidants comprising the oxygen-containing gas fed to said burner means and said stream is at least 40% by volume.

7. The process of claim 1 wherein the product of the higher heating value of the fuel and the mass flow rate of the fuel is greater than that defined by the following formula:

$$HHV \times Q > 50,000 \text{ (b.t.u./hr.)}$$

where: HHV=higher heating value, b.t.u./lb. and Q= mass flow rate of fuel, lbs./hr.

8. The process of claim 1 wherein the heat supplied from the burner means does not exceed 250,000 b.t.u./hr. per square inch of cross-sectional area of the taphole.

References Cited

UNITED STATES PATENTS

| | | | |
|---|---|---|---|
| 2,584,808 | 2/1952 | Newhouse | 266—38U |
| 3,663,203 | 5/1972 | Davis et al. | 75—65 |

HYLAND BIZOT, Primary Examiner

M. J. ANDREWS, Assistant Examiner

U.S. Cl. X.R.

75—46, 60, 65